__United States Patent__ [19]

Jaggard et al.

[11] 4,455,405

[45] Jun. 19, 1984

[54] PREPARATION OF PROPYLENE/ETHYLENE BLOCK COPOLYMERS

[75] Inventors: James F. R. Jaggard, Gruenstadt; Guenther Schweier, Friedelsheim; Peter Klaerner, Battenberg, all of Fed. Rep. of Germany

[73] Assignee: BASF Aktiengesellschaft, Fed. Rep. of Germany

[21] Appl. No.: 438,278

[22] Filed: Nov. 1, 1982

[30] Foreign Application Priority Data

Nov. 7, 1981 [DE] Fed. Rep. of Germany ....... 3144312

[51] Int. Cl.$^3$ ........................................... C08F 297/08
[52] U.S. Cl. ..................................... 525/53; 575/247; 575/270; 575/323
[58] Field of Search .................. 525/53, 247, 270, 323

[56] References Cited

U.S. PATENT DOCUMENTS

| 3,977,997 | 8/1976 | Schick et al. | 252/429 B |
|---|---|---|---|
| 4,154,699 | 5/1979 | Mueller-Tamm et al. | 252/429 B |
| 4,309,521 | 1/1982 | Sato | 525/247 |
| 4,316,966 | 2/1982 | Mineshima | 525/53 |
| 4,339,557 | 7/1982 | Hasuo | 525/247 |
| 4,368,304 | 1/1983 | Sato | 525/247 |
| 4,370,449 | 1/1983 | Bye | 525/247 |

FOREIGN PATENT DOCUMENTS 1032945 6/1966 United Kingdom .

Primary Examiner—Melvyn I. Marquis
Assistant Examiner—Patricia Short

Attorney, Agent, or Firm—Keil & Weinkauf

[57] ABSTRACT

Propylene/ethylene block copolymers are prepared by a process in which, in an agitated bed comprising small polymer particles, first (I) propylene is homopolymerized from the gas phase, in a first polymerization zone, by feeding in a Ziegler-Natta catalyst comprising (1) a titanium(III) component and (2) a dialkylaluminum chloride component, with or without (3) a further catalyst component, and then (II) the product obtained in the first polymerization zone is fed into a second polymerization zone, where a mixture of propylene and ethylene is polymerized with the propylene homopolymer present in this product.

In this process, the Ziegler-Natta catalyst employed contains a titanium(III) component (1) which is prepared by subjecting (1.1) a titanium-containing compound (a) of the formula TiCl$_3$. nAlCl$_3$ and (1.2) an electron donor (b), consisting of (b$_1$) an ester of a particular class or (b$_2$) a phosphorus-containing compound of a particular class, to a special milling procedure, the particular features of which are special metering and temperature conditions, suspending the resulting intermediate in a mixture of a liquid hydrocarbon (c) and an oxygen-containing compound (d), comprising (d$_1$) an ether of a certain class and/or (d$_2$) an ester of a certain class, and then heating the suspension obtained. The solid remaining in suspension is the titanium(III) component (1) which is to be employed for the polymerization. The polymer obtained has improved morphological properties.

12 Claims, No Drawings

PREPARATION OF PROPYLENE/ETHYLENE BLOCK COPOLYMERS

The present invention relates to a process for the preparation of propylene/ethylene block copolymers, in which, in each case in an agitated bed, in particular a fixed bed, consisting of small polymer particles and in the absence of a liquid reaction medium, first (I) propylene, at from 22 to 40, in particular from 23 to 34, bar, is homopolymerized from the gas phase, in a first polymerization zone at from 60° to 90° C., in particular from 65° to 87° C., by feeding in a Ziegler-Natta catalyst comprising (1) a titanium(III) component and
(2) a dialkyl-aluminum chloride component where each alkyl is of 1 to 8, in particular 2 to 4, carbon atoms, with or without
(3) a further catalyst component, and then (II) the product obtained in the first polymerization zone is fed into a second polymerization zone at from 30 to 70, in particular from 40° to 60° C., where a mixture of propylene and ethylene, at a propylene pressure of from 8 to 20, in particular from 10 to 16, bar and an ethylene pressure such that it gives from 1 to 30, in particular from 5 to 20, percent by weight of copolymerized ethylene units in the total polymer, is polymerized with the propylene homopolymer present in the product from the first polymerization zone, with the provisos that (i) the atomic ratio of titanium from the titanium(III) component (1): aluminum from the dialkyl-aluminum chloride component (2) is from 1:1 to 1:20, in particular from 1:2 to 1:15, (ii) the total pressure in the first polymerization zone is about 2–35, in particular 8–25, bar higher than that in the second polymerization zone, and (iii) from 60 to 99, in particular from 75 to 95, percent by weight of the total polymer is produced in the first polymerization zone, and the remainder thereof in the second polymerization zone.

Processes of this type are known, and have been successfully introduced into industry, the process disclosed in British Pat. No. 1,032,945 being a prototype of the present case.

A certain disadvantage of the processes under discussion which have been disclosed is that the morphology of the polymers obtained, in particular their pourability, is unsatisfactory. This is particularly the case when relatively high concentrations of ethylene and/or relatively high temperatures and/or relatively high pressures are employed in the second polymerization zone.

It is an object of the present invention to provide a process of the type defined at the outset, in which the above disadvantage is substantially reduced or completely eliminated.

We have found that this object is achieved if the Ziegler-Natta catalyst employed in this process contains a titanium(III) component (1) which is a particular further development (in particular one which features a special chemical after-treatment) of the titanium(III) components described in U.S. Pat. Nos. 4,154,699 and 3,977,997.

The present invention accordingly relates to a process for the preparation of propylene/ethylene block copolymers, in which, in each case in an agitated bed, in particular a fixed bed, consisting of small polymer particles and in the absence of a liquid reaction medium, first (I) propylene, at from 22 to 40, in particular from 23 to 34, bar, is homopolymerized, from the gas phase, in a first polymerization zone at from 60° to 90° C., in particular from 65° to 87° C., by feeding in a Ziegler-Natta catalyst comprising (1) a titanium(III) component and
(2) a dialkyl-aluminum chloride component where each alkyl is of 1 to 8, in particular 2 to 4, carbon atoms, with or without
(3) a further catalyst component, and then (II) the product obtained in the first polymerization zone is fed into a second polymerization zone at from 30 to 70, in particular from 40° to 60° C., where a mixture of propylene and ethylene, at a propylene pressure of from 8 to 20, in particular from 10 to 16, bar and an ethylene pressure such that it gives from 1 to 30, in particular from 5 to 20, percent by weight of copolymerized ethylene units in the total polymer, is polymerized with the propylene homopolymer present in the product from the first polymerization zone, with the provisos that (i) the atomic ratio of titanium from the titanium(III) component (1): aluminum from the dialkyl-aluminum chloride component (2) is from 1:1 to 1:20, in particular from 1:2 to 1:15, (ii) the total pressure in the first polymerization zone is about 2–35, in particular 8–25, bar higher than that in the second polymerization zone, and (iii) from 60 to 99, in particular from 75 to 95, percent by weight of the total polymer is produced in the first polymerization zone, and the remainder thereof in the second polymerization zone.

In the novel process, the Ziegler-Natta catalyst employed contains a titanium(III) component (1) which is prepared by subjecting (1.1) a titanium-containing compound (a) of the formula

TiCl$_3$.nAlCl$_3$ where n is from 0.01 to 1, in particular from 0.1 to 0.4, and (1.2) an electron donor (b), consisting of
(b$_1$) an ester which contains a total of 2 to 34, in particular 2 to 18, carbon atoms and is of the formula

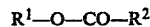

R$^1$—O—CO—R$^2$ or

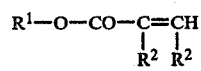

R$^1$—O—CO—C=CH
         |    |
         R$^2$  R$^2$ wherein R$^1$ is (I) alkyl of 1 to 16, in particular 1 to 8, carbon atoms or (II) phenylalkyl which is of, in total, 7 to 23, in particular 7 to 14, carbon atoms, and not more than 5 hydrogen atoms of the phenyl radical may be substituted by alkyl of 1 to 4 carbon atoms, and R$^2$ is (I) hydrogen, (II) alkyl of 1 to 18, in particular 2 to 12, carbon atoms, (III) phenylalkyl of, in total, 7 to 23, in particular 7 to 14, carbon atoms, and not more than 5 hydrogen atoms of the phenyl radical may be substituted by alkyl of 1 to 4 carbon atoms, (IV) phenyl or (V) alkylphenyl of, in total, 7 to 23, in particular 7 to 14, carbon atoms, and not more than 5 hydrogen atoms of the phenyl radical may be substituted by alkyl of 1 to 4 carbon atoms, or (b₂) a phosphorus-containing compound of the formula $$O_mPR_3^3,$$

where m is 0 or 1, $R^3$ is $R^4$, $OR^4$ or $NR_2^4$ and $R^4$ is an alkyl, aryl, alkaryl or aralkyl radical of no more than 24, in particular no more than 8, carbon atoms, to a milling procedure in which (A) a vibratory ball mill with an acceleration of from 30 to 80, in particular from 45 to 55, m.sec$^{-2}$ is employed, (B) the mill is first charged with the titanium-containing compound (a) and, if appropriate, is operated at from −50° to +100° C., in particular from −30° to +50° C. for from 0.5 to 100, in particular from 2 to 20, hours in the absence of a diluent, (C) an amount of electron donor (b) which corresponds to a molar ratio of titanium in the titanium-containing compound (a): electron donor (b) of from 1:0.01 to 1:1.5, in particular from 1:0.1 to 1:0.7, is then added at a rate of from 0.01 to 200, in particular from 1 to 80, ml/min per 2.5 kg of titanium-containing compound (a), either continuously or a little at a time, in the absence of a diluent, and while milling the mill base at from −50° to +80° C., in particular from −30° to +60° C., (D) the mill base is thereafter kept at from +15° to +100° C., in particular from +20° to +90° C., for from 1 to 120, in particular from 5 to 70, hours, while milling is continued, (E) is appropriate, the product obtained in (D) is then milled further for from 0.5 to 60, in particular from 2 to 30, minutes at from −50° to +5° C., in particular from −40° to 0° C., in the absence of a diluent, (F) if appropriate, and advantageously, the product obtained in (D) or (E) is then kept at from +20° to +150° C., in particular from ±45° to +100° C., for from 0.25 to 300, in particular from 2 to 150, hours, without subjecting it to milling, (G) if appropriate, the product obtained in (F) is thereafter milled further for from 0.5 to 60, in particular from 2 to 30, minutes at from −50° to +5° C., in particular from −40° to 0° C., in the absence of a diluent, thereafter (H) a suspension is prepared from
(H₁) 1 part by weight of the product obtained in (D), (E), (F) or (G),
(H₂) from 0.5 to 20, in particular from 0.7 to 2, parts by weight of a hydrocarbon (c) which is liquid under standard conditions of temperature and pressure and boils below 150° C., in particular below 100° C., and
(H₃) an oxygen-containing compound (d), consisting of (d₁) an ether which contains a total of 4 to 30, in particular 6 to 16, carbon atoms and is of the formula $$R^5-O-R^6$$

where $R^5$ and $R^6$ are identical or different and are each (I) alkyl of 1 to 15, in particular 3 to 8, carbon atoms, (II) phenyl or (III) alkylphenyl of, in total, 7 to 14, in particular 7 to 10, carbon atoms, and/or
(d₂) an ester which contains a total of 2 to 34, in particular 2 to 14, carbon atoms and is of the formula $$R^7-O-CO-R^8$$

or $$R^7-O-CO-\underset{R^8}{C}=\underset{R^8}{CH}$$

where $R^7$ is (I) alkyl of 1 to 8, in particular 1 to 4, carbon atoms, (II) phenyl or (III) phenylalkyl of, in total, 7 to 14, in particular 7 to 10, carbon atoms, and $R^8$ is (I) hydrogen, (II) alkyl of 1 to 12, in particular 1 to 9, carbon atoms, (III) phenylalkyl of, in total, 7 to 14, in particular 7 to 10, carbon atoms, and 1 hydrogen atom of the phenyl radical may be substituted by alkyl, (IV) phenyl or (V) alkyl of, in total, 7 to 14, in particular 7 to 10, carbon atoms, in an amount such that the molar ratio of titanium from the titanium-containing compound (a): oxygen-containing compound (d) is from 1:0.01 to 1:2, in particular from 1:0.08 to 1:0.15, (I) the suspension obtained in (H), under vigorous agitation, is then kept at from +40° to +140° C., in particular from +50° to +95° C., for from 5 to 120, in particular from 15 to 60, minutes, and thereafter brought to from +15° to +25° C., and (J) if appropriate, the solid is then isolated from the suspension obtained in (I), washed, if desired, with a hydrocarbon which is liquid under standard conditions of temperature and pressure and boils below 150° C., in particular below 100° C., and dried;

in this manner, the titanium(III) component (1) to be employed for the polymerization is obtained either as the suspended solid produced in (I) or as the solid isolated in (J).

As regards the novel process, the following points may be noted specifically.

The polymerization process as such can be carried out in virtually any appropriate conventional technological form, for example as a batchwise, periodic or continuous procedure, the special feature characteristic of the process being taken into account. The above forms, ie. the technological variants of the gas-phase polymerization of α-mono-olefins by the Zieger-Natta method, are well known from the literature and in industry, and therefore do not require further description here.

For the sake of completeness, it may be mentioned that, in the novel process, it is also possible to regulate the molecular weights of the polymers by the appropriate conventional measures, for example by means of regulators, such as, in particular, hydrogen.

Furthermore, it should also be noted that in the novel process the components of the catalyst may be introduced into the first polymerization zone in a variety of ways: for example, (i) the titanium component (1) and the alkyl-aluminum component (2), with or without the further catalyst component (3), can be introduced together, (ii) these components can be introduced at separate points, (iii) component (1) on the one hand and a mixture of components (2) and (3) on the other hand can be introduced at separate points (this method may be particularly advantageous), or (iiii) a mixture of components (1) and (3) on the one hand and component (2) on the other hand can be introduced at separate points.

As regards the composition of the novel titanium(III) component (1) of the catalyst, the following may be stated specifically:

The titanium-containing compounds (a) of the above formula which are used as starting materials are the appropriate conventional compounds, for example those which may be obtained by co-crystallization of $TiCl_3$ and $AlCl_3$, or reduction of $TiCl_4$ by means of aluminum or a mixture of aluminum and titanium. A particularly suitable co-crystallization product is that of the formula $TiCl_3.\frac{1}{3}AlCl_3$. Suitable titanium-containing compounds (a) are available commercially and therefore do not require further description.

The electron donors (b) are particular esters ($b_1$) or particular phosphorus-containing compounds ($b_2$).

In the present context, suitable esters ($b_1$) of the above formula are the appropriate conventional ones, in particular those of the formula where $R^1$ is methyl, ethyl, n-propyl, i-propyl, n-butyl, i-butyl, tert.-butyl, n-pentyl, i-pentyl, n-hexyl or benzyl, and $R^2$ is hydrogen, methyl, ethyl, n-propyl, i-propyl, n-butyl, i-butyl, tert.-butyl, n-pentyl, i-pentyl, n-hexyl, n-heptyl, n-octyl, phenyl, benzyl, 1-phenylethyl, 2-phenylethyl, 3-phenylpropyl, 4-phenylbutyl or 5-phenylpentyl.

Specific examples of suitable esters ($b_1$) are ethyl acetate, butyl acetate, ethyl propionate, ethyl n-butyrate, ethyl n-valerate, ethyl phenylacetate, ethyl 3-phenylpropionate, ethyl 4-phenylbutyrate, butyl acrylate and butyl methacrylate.

Suitable phosphorus-containing compounds ($b_2$) of the above formula are likewise the appropriate conventional ones, in particular those of the formula where $R^3$ is $R^{3'}$ or $NR_2^{3'}$, and $R^{3'}$, is $C_1$–$C_8$-alkyl, in particular $C_1$–$C_4$-alkyl, or phenyl.

Suitable compounds of this type are described in, for example, U.S. Pat. No. 3,186,977.

Specific examples of suitable phosphorus-containing compounds are triphenylphosphine, triphenylphosphine oxide, tri-n-butylphosphine, tri-n-butylphosphine oxide and hexamethylphosphorotriamide. Triphenylphosphine oxide and tri-n-butylphosphine are particularly suitable.

The liquid hydrocarbon (c) which is also used may be of the type which is conventionally combined with a titanium-containing component to give a Ziegler-Natta catalyst (eg. in the polymerization of α-monoolefines), without having an adverse effect on the catalyst or on its titanium-containing component. Examples of suitable hydrocarbons are pentanes, hexanes, heptanes, gasolines and cyclohexane.

The oxygen-containing compound (d) which is furthermore required for the preparation of the titanium-(III) component may be an ether ($d_1$) of the above formula or an ester ($d_2$) of the above formula.

Suitable ethers ($d_1$) are, once again, the appropriate conventional ones of the above formula, in particular those of the formula where $R^5$ and $R^6$ are each methyl, ethyl, propyl, butyl, amyl, hexyl or phenyl. Suitable compounds of this type are described in, for example, U.S. Pat. No. 3,116,274.

Specific examples of suitable ethers ($d_1$) are di-n-propyl ether, di-n-butyl ether, di-iso-pentyl ether, di-n-amyl ether, di-n-hexyl ether, methyl phenyl ether and ethyl phenyl ether, in particular di-n-butyl ether.

Suitable esters ($d_2$) are likewise the appropriate conventional ones of the above formula, in particular those of the formula where $R^8$ is hydrogen, methyl, ethyl, n-propyl, n-butyl, n-pentyl, i-pentyl, n-hexyl, n-heptyl, n-octyl, n-nonyl, n-decyl, n-undecyl, n-dodecyl, phenyl, benzyl, 1-phenylethyl, 2-phenylethyl, 3-phenylpropyl, 4-phenylbutyl or 5-phenylpentyl, and $R^7$ is methyl, ethyl, propyl, n-butyl, n-pentyl, i-pentyl, n-hexyl or benzyl.

Specific examples of suitable esters ($d_2$) are ethyl caproate, ethyl pelargonate and ethyl laurate.

The preparation of the novel titanium(III) component (1) is simple, and may be carried out by a skilled worker without further explanation being necessary. Only the points below need be mentioned.

It is advantageous to carry out the measure in (E) when it is desired to produce a polymer with a particularly narrow particle size distribution.

Carrying out the measure in (F) in general produces a particularly coarse-particled polymer, the catalyst productivity being reduced somewhat.

The measure in (G) in turn should be carried out only when an agglomerate is produced from stage (F).

In carrying out the measure in (H), ie. in preparing the corresponding suspension, it has been found to be advantageous in many cases if the solid is first combined with a relatively small amount of the hydrocarbon, and the total amount of the oxygen-containing compound is then added with the remainder of the hydrocarbon.

The suspension should be agitated vigorously in the course of carrying out the measure in (I), this agitation being effected most simply by stirring.

As regards the other components of the Ziegler-Natta catalyst employed according to the present invention, the following may be stated:

In respect of the dialkyl-aluminum chloride component (2):

Suitable dialkyl-aluminum chloride components are the appropriate conventional ones; these are well known from the literature and in industry and therefore do not require further description. An example of an outstanding compound of this type is diethyl-aluminum chloride.

In respect of the further catalyst components (3), which may or may not be present:

In this case, too, the usual amounts of the compounds which are conventionally used today are employed; these are likewise well known from the literature and in industry, and therefore do not require any further description.

However, it should be emphasized that certain phenolic substances can be employed, with very particular success, as further catalyst components (3) for the purpose according to the invention. The phenolic substances are those described in U.S. Pat. No. 4,260,710, and they are used in the amounts which are also stated in that patent. To avoid unnecessary repetition, the above patent is to this extent therefore made a part of the disclosure of the present invention.

EXAMPLE 1

Preparation of the titanium(III) component (1)

The procedure is carried out as follows: the titanium-containing compound (a) of the formula $TiCl_3.0.33AlCl_3$ and, as the electron donor (b), ethyl phenylacetate are subjected to a milling procedure in which (A) a vibratory ball mill with an acceleration of 50 m.sec$^{-2}$ is employed, (B) the mill is first charged with the titanium-containing compound (a), and operated at +30° C. for 16 hours in the absence of a diluent, (C) an amount of the ester (b) which corresponds to a molar ratio of titanium in the titanium-containing compound (a): ester (b) of 1:0.3 is then added continuously at a rate of 15 ml/min per 2.5 kg of titanium-containing compound (a), in the absence of a diluent and while milling the mill base at $-14°$ C., (D) the mill base is thereafter kept at $+50°$ C. for 50 hours, while milling is carried out, (E) the product obtained in (D) is then milled further for 20 minutes at $-15°$ C., in the absence of a diluent, (F) the product obtained in (E) is then kept at $+55°$ C. for 100 hours without being milled, and thereafter is loosened slightly, (G) is dispensed with, thereafter (H) a suspension is prepared from ($H_1$) 1 part by weight of the product obtained in (F), ($H_2$) 1.5 parts by weight of n-heptane as the hydrocarbon (c), and ($H_3$) ethyl pelargonate, as the oxygen-containing compound (d), in an amount such that the molar ratio of titanium from the titanium-containing compound (a): oxygen-containing compound (d) is 1:0.12, (I) the suspension obtained in (H) is kept at $+90°$ C. for 35 minutes, while stirring vigorously, and thereafter brought to $+22°$ C., and (J) the solid is isolated from the suspension obtained in (I), and is washed with n-heptane and dried; in this manner, the titanium(III) component (1) is obtained as the solid isolated in (J).

Polymerization using the titanium(III) component (1)

In an appropriate conventional apparatus, ie. a cascade (cf. British Pat. No. 1,032,945 in this context), a propylene/ethylene block copolymer is prepared continuously by a process in which, in each case in an agitated fixed bed (a stirred concentric fixed bed) consisting of small polymer particles, and in the absence of a liquid reaction medium, first (I) propylene, under a pressure of 28 bar, is homopolymerized, from the gas phase, in a first polymerization zone with a useful volume of 200 liters, at 70° C., by metering in, continuously and separately, a Ziegler-Natta catalyst comprising (1) the above titanium(III) component (in an amount of 15 millimoles/hour, calculated as titanium), (2) diethyl-aluminum chloride and (3) n-octadecyl-$\beta$-(4'-oxy-3',5'-di-tert.-butylphenyl)-propionate, and then (II) the product obtained in the first polymerization zone is fed into a second polymerization zone with a useful volume of 200 liters and at 50° C., where a mixture of propylene and ethylene, under a propylene pressure of 7.9 bar and an ethylene pressure (3.1 bar) such that the total polymer contains 9.3 percent by weight of ethylene as copolymerized units, is polymerized with the propylene homopolymer present in the product from the first polymerization zone, with the provisos that (i) the atomic ratio of titanium from the titanium(III) component (1): aluminum from the dialkyl-aluminum chloride component (2) is 1:7, and the molar ratio of the dialkyl-aluminum chloride component (2): further catalyst component (3), ie. the n-octadecyl-$\beta$-(4'-oxy-3',5'-di-tert.-butylphenyl)-propionate, is 1:0.07, (ii) the total pressure in the first polymerization zone is 17 bar higher than that in the second polymerization zone, and (iii) 92.5 percent by weight of the total polymer (17.3 kg/hour) is produced in the first polymerization zone and the remainder is produced in the second polymerization zone. This polymer has good morphological properties, in particular good pourability.

EXAMPLE 2

Preparation of the titanium(III) component (1)

The preparation is carried out by the procedure described in Example 1.

Polymerization using the titanium(III) component (1)

In the apparatus described in Example 1, a propylene/ethylene block copolymer is prepared continuously by a process in which, in each case in an agitated fixed bed (a stirred concentric fixed bed) consisting of small polymer particles, and in the absence of a liquid reaction medium, first (I) propylene, under a pressure of 32 bar, is homopolymerized, from the gas phase, in a first polymerization zone with a useful volume of 200 liters, at 85° C., by metering in, continuously and separately, a Ziegler-Natta catalyst comprising (1) the above titanium(III) component (in an amount of 13.1 millimoles/hour, calculated as titanium), (2) diethyl-aluminum chloride and (3) the tetra-ester of $\beta$-(4'-oxy-3',5'-di-tert.-butylphenyl)-propionic acid with pentaerythritol, and then (II) the product obtained in the first polymerization zone is fed into a second polymerization zone with a useful volume of 200 liters and at 50° C., where a mixture of propylene and ethylene, under a propylene pressure of 10.4 bar and an ethylene pressure (4.6 bar) such that the total polymer contains 8.4 percent by weight of ethylene as copolymerized units, is polymerized with the propylene homopolymer present in the product from the first polymerization zone, with the provisos that (i) the atomic ratio of titanium from the titanium(III) component (1): aluminum from the dialkyl-aluminum chloride component (2) is 1:9, and the molar ratio of the dialkyl-aluminum chloride component (2): further catalyst component (3), ie. the tetra-ester of $\beta$-(4'-oxy-3',5'-di-tert.-butylphenyl)-propionic acid with pentaerythritol, is 1:0.025, (ii) the total pressure in the first polymerization zone is 17 bar higher than that in the second polymerization zone, and (iii) 89.9 percent by weight of the total polymer (17.8 kg/hour) is produced in the first polymerization zone and the remainder is produced in the second polymerization zone. This polymer likewise has good morphological properties, in particular good pourability.

We claim:

1. A process for the preparation of a propylene/ethylene block copolymer, in which, in each case in an agitated bed consisting of small polymer particles and in the absence of a liquid reaction medium, first (I) propylene, at from 23 to 34 bar is homopolymerized, from the gas phase, in a first polymerization zone at from 65° to 87° C. by feeding in a Ziegler-Natta catalyst comprising (1) a titanium(III) component and (2) a dialkyl-aluminum chloride component where each alkyl is of 2 to 4 carbon atoms, and (3) a further catalyst component, and then (II) the product obtained in the first polymerization zone is fed into a second polymerization zone at from 40° to 60° C., where a mixture of propylene and ethylene, at a propylene pressure of from 10 to 16 bar and an ethylene pressure such that it gives from 5 to 20 percent by weight of copolymerized ethylene units in the total polymer, is polymerized with the propylene homopolymer present in the product from the first polymerization zone, with the provisos that (i) the atomic ratio of titanium from the titanium(III) component (1):aluminum from the dialkyl-aluminum chloride component (2) is from 1:2 to 1:15, (ii) the total pressure in the first polymerization zone is 8–25 bar higher than that in the second polymerization zone, and (iii) from 75 to 95 percent by weight of the total polymer is produced in the first polymerization zone, and the remainder thereof in the second polymerization zone, wherein the Ziegler-Natta catalyst employed contains a titanium(III) component (1) which is prepared by subjecting (1.1) a titanium-containing compound (a) of the formula $$TiCl_3 \cdot nAlCl_3$$

where n is from 0.1 to 0.4 and (1.2) an electron donor (b), consisting of an ester which contains a total of 2 to 18 carbon atoms and is of the formula $$R^1-O-CO-R^2$$

where $R^1$ is alkyl of 1 to 8 carbon atoms, and $R^2$ is phenylalkyl of, in total, 7 to 14 carbon atoms, to a milling procedure in which (A) a vibratory ball mill with an acceleration of from 45 to 55 m.sec$^{-2}$ is employed, (B) the mill is first charged with the titanium-containing compound (a) and is operated at from $-30°$ to $+50°$ C. for from 2 to 20 hours in the absence of a diluent, (C) an amount of electron donor (b) which corresponds to a molar ratio of titanium in the titanium-containing compound (a): electron donor (b) of from 1:0.1 to 1:0.7 is then added at a rate of from 1 to 80 ml/min per 2.5 kg of titanium-containing compound (a) continuously in the absence of a diluent, and while milling the mill base at from $-30°$ to $+60°$ C., (D) the mill base is thereafter kept at from $+20$ to $+90°$ C. for from 5 to 70 hours, while milling is continued, (E) the product obtained in (D) is then milled further for from 2 to 30 minutes at from $-40°$ to $0°$ C. in the absence of a diluent, (F) the product obtained in (E) is then kept at from $+45°$ to $+100°$ C. for from 2 to 150 hours, without subjecting it to milling, thereafter (H) a suspension is prepared from (H$_1$) 1 part by weight of the product obtained in (F), (H$_2$) from 0.7 to 2 parts by weight of a hydrocarbon (c) which is liquid under standard conditions of temperature and pressure and boils below 100° C., and (H$_3$) an oxygen-containing compound (d), consisting of an ether which contains a total of 4 to 30 carbon atoms and is of the formula $$R^5-O-R^6$$

where $R^5$ and $R^6$ are identical or different and are each (I) alkyl of 1 to 15 carbon atoms, (II) phenyl or (III) alkylphenyl of, in total, 7 to 14 carbon atoms, and/or an ester which contains a total of 2 to 14 carbon atoms and is of the formula $$R^7-O-CO-R^8$$

where $R^7$ is alkyl of 1 to 4 carbon atoms, and $R^8$ is alkyl of 1 to 9 carbon atoms, in an amount such that the molar ratio of titanium from the titanium-containing compound (a):oxygen-containing compound (d) is from 1:0.08 to 1:0.5

(I) the suspension obtained in (H), under vigorous agitation, is then kept at from $+50°$ to $+95°$ C. for from 15 to 60 minutes, and thereafter brought to from $+15°$ to $+25°$ C., and (J) the solid is then isolated from the suspension obtained in (I), washed with a hydrocarbon which is liquid under standard conditions of temperature and pressure and boils below 100° C., and dried; in this manner, the titanium(III) component (1) to be employed for the polymerization is obtained as the solid isolated in (J).

2. The process of claim 1, wherein the further catalyst component (3) is n-octadecyl-beta-(4'-oxy-3',5'-di-tert.-butylphenyl)-propionate.

3. The process of claim 1, wherein (1.1) the titanium-containing compound (a) is TiCl$_3 \cdot$ 0.33AlCl$_3$.

4. The process of claim 2, wherein (1.1) the titanium containing compound (a) is TiCl$_3 \cdot$ 0.33AlCl$_3$.

5. The process of claim 1, wherein (1.2) the electron donor (b) is ethyl phenylacetate.

6. The process of claim 2, wherein (1.2) the electron donor (b) is ethyl phenylacetate.

7. The process of claim 3, wherein (1.2) the electron donor (b) is ethyl phenylacetate.

8. The process of claim 1, wherein (H$_3$) the oxygen-containing compound (d) is ethyl pelargonate.

9. The process of claim 2, wherein (H$_3$) the oxygen-containing compound (d) is ethyl pelargonate.

10. The process of claim 3, wherein (H$_3$) the oxygen-containing compound (d) is ethyl pelargonate.

11. The process of claim 4, wherein (H$_3$) the oxygen-containing compound (d) is ethyl pelargonate.

12. The process of claim 5, wherein (H$_3$) the oxygen-containing compound (d) is ethyl pelargonate.

* * * * *